No. 720,253. PATENTED FEB. 10, 1903.
R. E. JEFFERY.
VEHICLE WHEEL.
APPLICATION FILED OCT. 27, 1902.
NO MODEL.
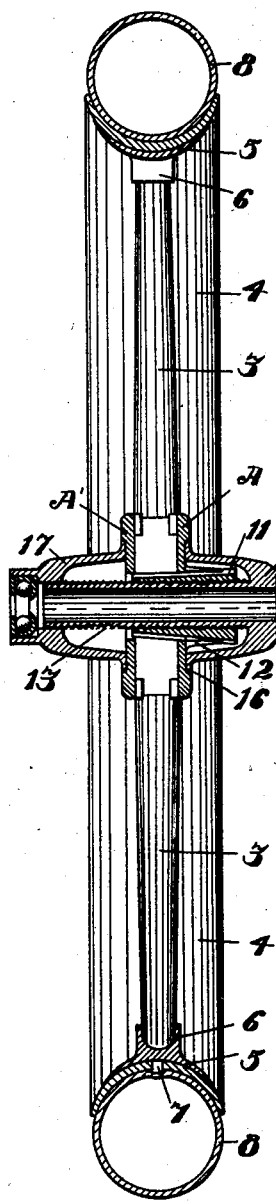
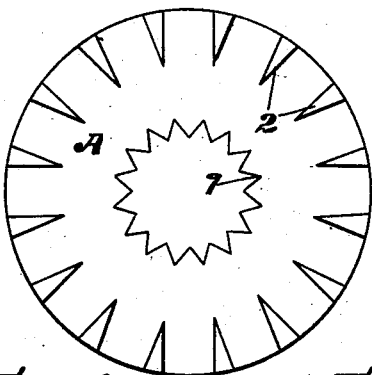
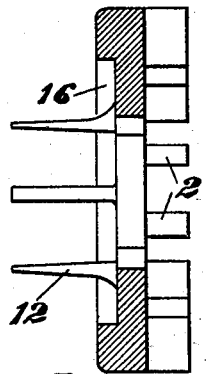
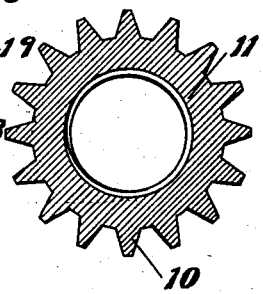
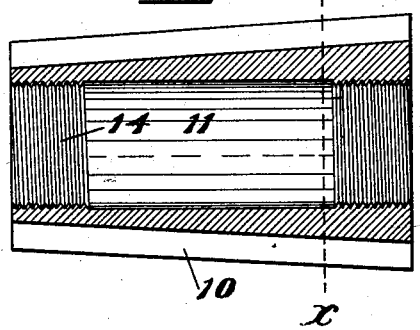
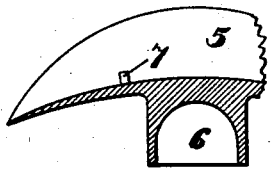
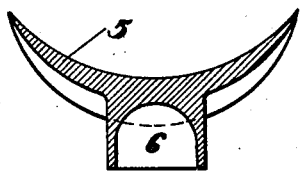
Witnesses,
Inventor,
Richard E. Jeffery
By Dewey Strong
atty

UNITED STATES PATENT OFFICE.

RICHARD EDGAR JEFFERY, OF GRASS VALLEY, CALIFORNIA.

VEHICLE-WHEEL.

SPECIFICATION forming part of Letters Patent No. 720,253, dated February 10, 1903.

Application filed October 27, 1902. Serial No. 129,027. (No model.)

*To all whom it may concern:*

Be it known that I, RICHARD EDGAR JEFFERY, a citizen of the United States, residing at Grass Valley, county of Nevada, State of California, have invented an Improvement in Vehicle-Wheels; and I hereby declare the following to be a full, clear, and exact description of the same.

My invention relates to improvements in wheels for automobiles and other vehicles, and particularly in that type of wheels having separable hub-sections. Its object is to simplify the construction, improve the means for tightening the spokes, and adapt the use of wooden spokes to a metal rim.

It consists of the parts and the construction and combination of parts hereinafter more fully described, having reference to the accompanying drawings, in which—

Figure 1 is a central section through a wheel, illustrating my invention. Figs. 2 and 3 are views of hub-disk. Fig. 4 is a cross-section on line $x\ x$ of Fig. 5. Fig. 5 is a vertical longitudinal section of corrugated cone. Figs. 6 and 7 are sectional views of spoke-clip.

A A' represent centrally-perforated complementary disks forming part of the hub of my improved wheel. The adjacent surfaces of the disks are provided with the radially-disposed lugs 2, equidistant from each other and between which the inner ends of the spokes 3 are adapted to be held. These spokes are here shown as made of wood and used in conjunction with a metal rim.

Heretofore it has been general to confine the use of wooden spokes to rims of like material and, conversely, to use only metal spokes with metal rims.

The advantages of a combination of a metal rim and wooden spokes are recognized, and it has been one aim of my present invention to afford a practicable means of effecting such combination.

As here shown, 4 is a metal rim of well-known construction to which are secured the clips 5 at equidistant points, and each clip has an inwardly-projecting sleeve or socket portion 6, in which a spoke end is seated. A convenient manner of securing these clips to the rim is as follows: Each clip is provided on its concaved surface with the lugs 7. Holes corresponding to these lugs are bored in the rim, the clip set in position on the rim, and the lugs suitably headed on the opposite side, after which the tire 8 may be put on and cemented or otherwise secured to the rim. The central openings of the disks have their edges similarly serrated, as at 9, and correspondingly with the longitudinal peripheral corrugations 10 of a hollow conical wedge 11, which is passed through said openings and adapted to abut against the ends of the spokes for the purpose of tightening the latter. Each groove in the cone forms a seat for a spoke. One of the disks, as A, is provided on its outer surface with the lateral guide extensions 12, which fit certain of the corrugations to support the cone when being inserted and to prevent its turning when being drawn up.

The adjustment of the cone and the locking together of the parts are effected by the following means: 13 is a hollow core or thimble-skein exteriorly threaded correspondingly with the interior threads 14 of the cone through which the thimble is adapted to be screwed. Secured to one end of the thimble or made integral therewith is a cap 15, which incloses the guides 12 and the protuberant larger end of the conical wedge and seats in an annular recess 16 on plate A when the thimble has been inserted through the cone. A corresponding cap 17 screws onto the projecting end of the thimble and bears against plate A'. The caps are formed with the polygonal surfaces 18 to receive a wrench by which the parts may be turned. Each cap is provided with suitable antifrictional bearings, as indicated at 19.

In operation the spokes are inserted in the sockets on the clips. The inner ends of the spokes are inclosed by the disks A A' in the mortises formed by lugs 2, with the ends of the spokes projecting slightly into the opening through the disks. The cone-wedge 11 is then inserted from the side on which are disposed the guides 12 and the thimble screwed in until its end projects beyond plate A' sufficiently to be engaged by cap 17. By screwing up the latter the wedge-cone is drawn into the hub against the ends of the spokes, expanding them radially to seat firmly in the sockets against the rim.

To tighten the spokes in the sockets at any time thereafter, it is only necessary to unscrew cap 15 one or more turns, as necessary, and then screw up cap 17 until cap 15 is seated firmly.

If spokes are loose in the hub, only screw up cap 17. To replace one or more spokes, unscrew cap 17 and remove plate A', whereupon any or all spokes can be removed.

Having thus described my invention, what I claim, and desire to secure by Letters Patent, is—

1. The combination in a wheel-hub, of opposing perforated plates between which the ends of the spokes are engaged, lateral projections at right angles to the plane of said plates, a hollow conical wedge passing through the perforations in said plates and bearing against the ends of the spokes, said wedge having peripheral corrugations in which said lateral projections may be engaged, and means upon the hub for compressing and locking the parts.

2. The combination in a vehicle-wheel, of opposing perforated plates having projections on their adjacent faces forming mortises for the spoke-tenons, the edges of the perforations in said plates serrated, a conical wedge inserted in said perforations and having longitudinal peripheral grooves corresponding to said serrations and forming seats for the spoke-tenons, and means for inclosing said wedge and binding the parts together.

3. The combination in a vehicle-wheel, of perforated plates between which the spoke-tenons are mortised, a hollow conical wedge passing through said plates and engaging the ends of the spokes, guide means upon one of said plates engaging the wedge to prevent its turning, a core concentric with said wedge, and means engaging said core and plates to draw the wedge inward and expand the spokes.

4. The combination in a vehicle-wheel, of perforated plates between which the spoke-tenons are mortised, a longitudinally and peripherally corrugated hollow conical wedge inserted in said perforations, guide means upon said plates engaging said grooves, a hollow core or thimble concentric with said wedge, and inclosing and binding means upon the core.

In witness whereof I have hereunto set my hand.

RICHARD EDGAR JEFFERY.

Witnesses:
SAMUEL J. ALDERMAN,
HENRY C. CARR.